UNITED STATES PATENT OFFICE.

HEINRICH POLIKIER, OF BERLIN, GERMANY, ASSIGNOR TO ACTIEN GESELL-SCHAFT FÜR ANILIN FABRIKATION, OF BERLIN, GERMANY.

BLUE DYE.

SPECIFICATION forming part of Letters Patent No. 688,967, dated December 17, 1901.

Application filed September 28, 1901. Serial No. 76,957. (No specimens.)

*To all whom it may concern:*

Be it known that I, HEINRICH POLIKIER, of Berlin, in the Kingdom of Prussia, German Empire, have invented new and useful Improvements in Blue Dyes; and I do hereby declare that the following is a full, clear, and exact description of the invention, which will enable others skilled in the art to which it appertains to make and use the same.

I have found that the alkylated derivatives of meta-tolyl-alpha- or beta-naphthylamin may easily be condensed with tetraälkyldiamidobenzophenone, thus yielding most valuable dyestuffs, which are distinguished by the excellent clearness of their shades and by their extraordinary fastness to alkalies. This latter property is the more astonishing as the blue coloring-matters of the triphenyl and diphenyl naphthylmethane series hitherto known in the market generally are more sensitive to alkalies, the shades of the Victoria blues, for instance, being considerably changed by the action of ammonia.

The above-mentioned alkylated derivatives of the meta-tolyl-naphthylamins have not yet been hitherto described in literature. They may be produced as follows: Meta-toluidin-hydrochlorid is heated with alpha or beta naphthylamin or alpha or beta naphthol until a sample proves to be free from the naphthylamin or naphthol employed. The mass is then rendered alkaline and the excess of meta-toluidin is distilled off with steam. In order to isolate the meta-tolyl-naphthylamin thus formed the product is purified by distillation *in vacuo*. Meta-tolyl-alpha-naphthylamin is a light yellow oil which under a pressure of one hundred and forty millimeters boils at about 350° centigrade. Meta-tolyl-beta-naphthylamin crystallizes from alcohol in white shining leaflets melting at 70° centigrade. By the well-known methods both these meta-tolyl-naphthylamins may easily be transformed into their alkylated derivatives. Methyl-meta-tolyl-alpha-naphthylamin, for instance, is a liquid which under a pressure of one hundred and twenty millimeters boils at about 340° centigrade. Methyl-meta-tolyl-beta-naphthylamin is a liquid which under a pressure of one hundred and twenty millimeters boils at about 350° centigrade. In order to transform the parent materials thus produced into the coloring-matters which form the object of the present application, I proceed as follows: A mixture of twenty parts of tetramethyldiamidobenzophenone, seventeen parts of methyl-meta-tolyl-beta-naphthylamin, five parts of toluene, and fifteen parts of phosphorous oxychlorid is melted on the water-bath until a sample dissolves clearly in water. The mass is then poured into water, and from the solution obtained the dyestuff is salted out in the form of a reddish-brown resinous mass. When dried and pulverized, it forms a red-brown powder, easily soluble in water or alcohol, forming clear blue solutions. The aqueous solution remains unchanged on addition of a small amount of sodium carbonate or caustic-soda lye; but it is precipitated by an excess of these agents in the form of blue flakes.

The dyestuff dissolves in concentrated sulfuric acid to an orange-brown solution, which on gradual dilution with ice-water becomes greenish-brown, green, and finally clear blue.

The dyestuff produces on wool clear-blue shades of great intensity.

The result is not essentially changed if for methyl-meta-tolyl-beta-naphthylamin employed in the above example one of the other bases above mentioned is substituted or if for tetramethyldiamidobenzophenone is substituted tetraethyldiamidobenzophenone.

Having thus described my invention and in what manner the same is to be performed, what I claim as new is—

The new basic dyestuff produced by condensing alkyl-meta-tolyl-naphthylamin and tetraälkyldiamidobenzophenone with the aid of phosphorus oxychlorid; said dyestuff forming in the dry state a red-brown powder, easily soluble in alcohol or water, forming clear-blue solutions; the aqueous solution remaining unchanged on addition of a small amount of sodium carbonate or caustic-soda lye, being precipitated by an excess of these agents in the form of blue flakes; the dye dissolving in concentrated sulfuric acid to an orange-brown solution which on gradual dilution with ice-water becomes greenish-brown, green and finally clear blue, and producing on wool clear blue shades of great intensity.

In witness whereof I have hereunto signed my name, this 13th day of September, 1901, in the presence of two subscribing witnesses.

H. POLIKIER.

Witnesses:
WOLDEMAR HAUPT,
HENRY HARPER.